(12) United States Patent
Barber

(10) Patent No.: US 11,076,582 B2
(45) Date of Patent: Aug. 3, 2021

(54) APPARATUS AND METHOD FOR STREAM AND OYSTER REEF RESTORATION

(71) Applicant: James Patrick Barber, Buford, GA (US)

(72) Inventor: James Patrick Barber, Buford, GA (US)

( * ) Notice: Subject to any disclaimer, the term of this patent is extended or adjusted under 35 U.S.C. 154(b) by 1102 days.

(21) Appl. No.: 14/392,261

(22) PCT Filed: Jun. 25, 2014

(86) PCT No.: PCT/US2014/044003
§ 371 (c)(1),
(2) Date: Dec. 26, 2015

(87) PCT Pub. No.: WO2014/210100
PCT Pub. Date: Dec. 31, 2014

(65) Prior Publication Data
US 2016/0174530 A1    Jun. 23, 2016

Related U.S. Application Data

(60) Provisional application No. 61/840,587, filed on Jun. 28, 2013.

(51) Int. Cl.
*A01K 61/70* (2017.01)
*A01K 61/54* (2017.01)

(52) U.S. Cl.
CPC .............. *A01K 61/70* (2017.01); *A01K 61/54* (2017.01); *Y02A 40/81* (2018.01)

(58) Field of Classification Search
CPC ........ A01K 61/00; A01K 61/50; A01K 61/53; A01K 61/54; A01K 61/55; A01K 61/70; A01K 61/78; E02B 3/046
See application file for complete search history.

(56) References Cited

U.S. PATENT DOCUMENTS 456,390 A * 7/1891 Willis .................... A01K 61/54
119/238
3,017,856 A    1/1962 Munz
(Continued)

FOREIGN PATENT DOCUMENTS

EP    1266567    12/2002
EP    1321371    6/2003
(Continued)

OTHER PUBLICATIONS

"Biological Monitoring of Stream Restoration Projects in North Carolina" by NC Ecosystem Enhancement Program Dec. 1, 2008.
(Continued)

*Primary Examiner* — Monica L Barlow
*Assistant Examiner* — Michael A. Fabula
(74) *Attorney, Agent, or Firm* — William G. Giltinan; J. Coy Stull; Carlton Fields, PA

(57) ABSTRACT

An apparatus and method for promoting macrobenthic growth in a waterway. The apparatus comprises a biodegradable net bag with a biodegradable panel insert that is adapted to receive a biomass Suitable for attracting and promoting macrobenthic growth. The method comprises providing a suitable net bag, filling it with an appropriate biomass, deploying it in a healthy waterway until macrobenthic growth has become established, and transporting and redeploying it in a second waterway requiring remediation.

5 Claims, 4 Drawing Sheets

(56) References Cited

U.S. PATENT DOCUMENTS

| | | | | |
|---|---|---|---|---|
| 3,196,833 | A | | 7/1965 | Glancy |
| 3,779,209 | A | * | 12/1973 | Budge ................. A01K 61/54 119/240 |
| 3,811,411 | A | * | 5/1974 | Moeller ............... A01K 61/54 119/241 |
| 4,056,936 | A | | 11/1977 | Mayer |
| 4,328,764 | A | * | 5/1982 | Nickel ................. A01K 61/54 119/239 |
| 4,439,059 | A | * | 3/1984 | Kikuzawa ............. E02B 3/046 405/25 |
| 4,947,791 | A | * | 8/1990 | Laier ................... A01K 61/70 119/221 |
| 5,007,377 | A | * | 4/1991 | Muench, Jr. .......... A01K 61/59 119/241 |
| 5,158,395 | A | * | 10/1992 | Holmberg ............ E02B 3/127 405/15 |
| 5,201,136 | A | * | 4/1993 | LaMorte .............. A01K 61/70 43/4 |
| 5,269,254 | A | * | 12/1993 | Gagliano ............. A01K 61/54 119/237 |
| 5,338,131 | A | * | 8/1994 | Bestmann ............ E02B 3/12 405/24 |
| 5,400,745 | A | * | 3/1995 | Saxby ................. A01K 61/54 119/239 |
| 5,421,123 | A | * | 6/1995 | Sakate ................ E02D 17/20 405/302.7 |
| 5,429,074 | A | * | 7/1995 | Nelson ................ A01K 61/54 119/239 |
| 5,641,244 | A | * | 6/1997 | Bestmann ............ E02B 3/125 405/16 |
| 5,762,499 | A | | 6/1998 | Hey |
| 5,807,024 | A | * | 9/1998 | Benedict ............. E02B 3/18 256/12.5 |
| 6,464,428 | B1 | * | 10/2002 | Mikell ................ E02B 3/126 405/15 |
| 6,929,425 | B1 | * | 8/2005 | Kimberlin ............ C09K 17/52 405/302.4 |
| 7,303,084 | B2 | * | 12/2007 | McPhillips ........... A01N 25/08 210/501 |
| 7,422,582 | B2 | | 9/2008 | McPhillips |
| 8,864,424 | B2 | * | 10/2014 | Jones ................. D03D 1/0041 405/15 |
| 9,011,005 | B2 | * | 4/2015 | Lin .................... B65D 33/00 114/27 |
| 9,637,886 | B2 | * | 5/2017 | Hawkinson ........... A01N 25/00 |
| 9,832,979 | B2 | * | 12/2017 | Kabiling, Jr. ......... E02B 3/046 |
| 2002/0088408 | A1 | * | 7/2002 | Lee .................... A01K 61/70 119/221 |
| 2002/0131826 | A1 | * | 9/2002 | Spangler ............. E02B 3/04 405/302.4 |
| 2005/0120692 | A1 | * | 6/2005 | Kim .................... A01D 51/00 56/1 |
| 2006/0021311 | A1 | * | 2/2006 | Kim .................... A01G 20/30 56/1 |
| 2006/0032804 | A1 | * | 2/2006 | McPhillips ........... A01N 25/08 210/205 |
| 2006/0165925 | A1 | * | 7/2006 | Shelby ................ A01K 61/54 428/34.1 |
| 2007/0184239 | A1 | * | 8/2007 | Mallory ............... B32B 29/02 428/99 |
| 2008/0019780 | A1 | * | 1/2008 | Hastings ............. E02D 29/0291 405/302.6 |
| 2008/0251446 | A1 | * | 10/2008 | Vangedal-Nielsen ....................... B01D 39/2055 210/500.4 |
| 2011/0150369 | A1 | * | 6/2011 | Burchfield ........... B65F 1/0006 383/33 |
| 2011/0173932 | A1 | * | 7/2011 | John .................. E02B 3/04 53/473 |
| 2013/0125825 | A1 | * | 5/2013 | Kania ................. E02B 3/046 119/221 |
| 2014/0226918 | A1 | * | 8/2014 | Adams ............... E02D 29/02 383/1 |
| 2015/0189861 | A1 | * | 7/2015 | Kabiling, Jr. ......... E02B 3/046 119/221 |

FOREIGN PATENT DOCUMENTS

| | | | | |
|---|---|---|---|---|
| EP | 1321371 A2 | * | 6/2003 | ............ B65D 29/02 |
| WO | 2012125823 | | 9/2012 | |

OTHER PUBLICATIONS

"Macroinvertebrates in Urban Streams: Negative Relationships between Impervious Surface Cover and Macroinvertebrate Biomass Indicate Reduced Biotic Function" Proceedings of the 2013 Georgia Water Resources Conference, held Apr. 10-11, 2013, at the University of Georgia <Georgia https://smartech.gatech.edu/bitstream/handle/1853/51496/4.4.2_Wood.pdf?sequence=1&isAllowed=y> Apr. 10, 2013.

A Function-Based Framework—Chapter 10: Biology, Macroinvertebrate Communities, p. 204 <https://www.epa.gov/sites/production/files/2015-08/documents/a_function_based_framework_for_stream_assessment_3.pdf> May 012.

Leaf litter processing in low order streams, pp. 1-10 <http://citeseerx.ist.psu.edu/viewdoc/download?doi=10.1.1.690.5592&rep=rep1&type=pdf> 2006.

"Leaf Pack Restoration Techniques" presented at Mid-Atlantic Conference, presenter J. Patrick Barber Oct. 31, 2013.

\* cited by examiner

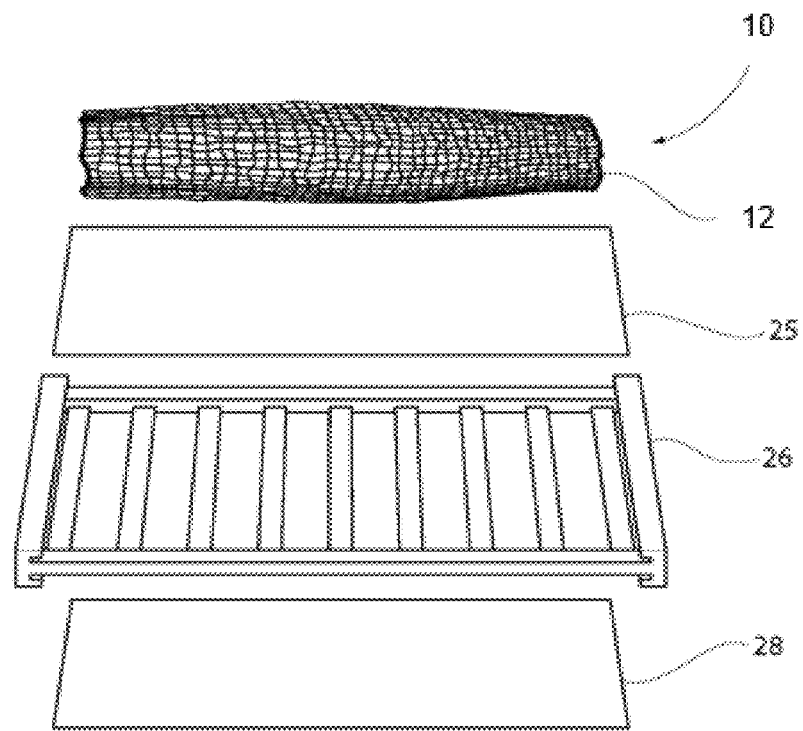
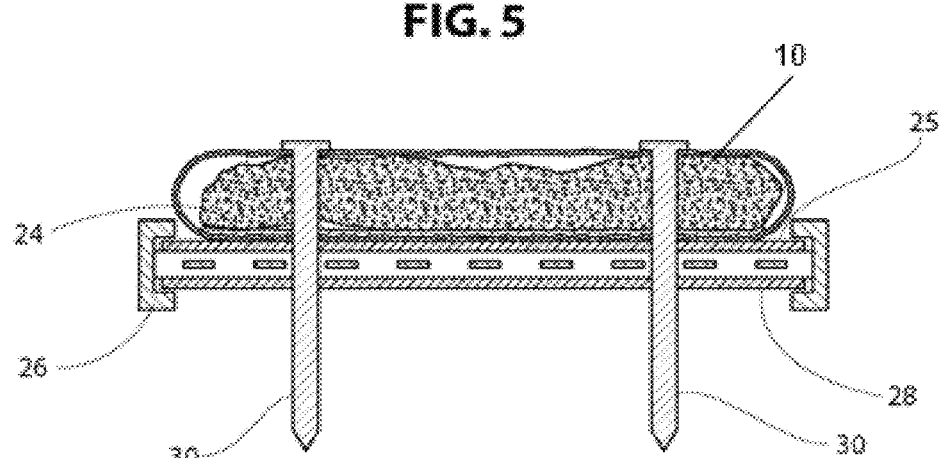
FIG. 5
FIG. 6

APPARATUS AND METHOD FOR STREAM AND OYSTER REEF RESTORATION

CROSS-REFERENCE TO RELATED APPLICATION

This application claims priority from U.S. provisional patent application Ser. No. 61/840,587 filed Jun. 28, 2013, which is hereby incorporated by reference in its entirety.

BACKGROUND

This present invention relates in general to apparatuses and methods used in environmental remediation of waterways. In freshwater waterways such as streams, an important aspect of environmental remediation is the creation or restoration of habitat for benthic macro-invertebrate (macrobenthic) organisms. In saltwater waterways, an important aspect of environmental remediation often involves creation or recreation of oyster reefs in estuaries and other similar habitats. Apparatuses and methods disclosed herein are useful in creating or restoring such habitats in an efficient and environmentally friendly manner.

As the design and monitoring processes for stream mitigation advance, the requirements from the regulatory community have become more stringent. Monitoring for a successful restoration project was originally based on the stabilization of the stream channel and providing macro-habitat for stream fauna. As the science of stream restoration has developed, a successful restoration project is more frequently defined as one that provides a functional uplift to the stream that results in the successful restoration of the stream's fauna. If the stream channel's physical characteristics have been stabilized and the substrate has been allowed to culture, then the organisms that are dependent upon this habitat can thrive.

Since the first stream restoration project, restoration has worked under the premise that if you build a stable stream channel, then the aquatic fauna will return to the stream reach. The original restoration premise was that fish and large invertebrates will migrate upstream and downstream into stabilized stream reaches. However, research has shown that macrobenthics are extremely slow to re-populate any area. This was confirmed by an EPA study in 2002 by Mr. Dave Penrose and updated for the NC Ecosystem Enhancement Program in 2008. That study found that restored streams with healthy upstream and downstream populations of macrobenthics were very slow to re-populate. Post construction macrobenthic monitoring of restored streams found that many of these streams did not meet re-population goals or guidelines that were established to ensure a stable macrobenthic population.

Unlike fish and many larger invertebrates, macrobenthic organisms are not very mobile. In many restoration projects, the upper reaches of the streams may never fully recover due to a lack of micro-habitat for the macrobenthics, nor can there be recruitment to the restored reach from upstream sources. Many of these organisms cannot swim upstream. While numerous individuals can move upstream during their adult stages, the larval microbenthics/microorganisms that support these individuals do not move as readily.

Recently restored stream channels may also lack adjacent vegetation which can provide vegetative material for stream leaf packs, which form the basic platform of cover and food substrate for many macrobenthic organisms.

These situations leave the organisms without the proper substrate or supportive habitat.

During the early stages of wetland mitigation, it was found that seeding or planting more desirable tree species in a wetland system allowed for a faster recovery of the system. This 'jump starting' of the ecosystem concept was taken even further when current wetland soils were taken from impacted sites and used in restoration and creation projects to reseed the wetland soils. Both of these techniques were found to be effective in speeding up the restoration process.

This result is consistent with the conclusion that one of the biggest restrictions that newly restored streams have in attracting macrobenthics is the lack of the proper medium/ micro-habitat for them to grow. More particularly, most restoration or impaired streams lack the leaf pack that is mandatory for these organisms to live and reproduce. Embodiments of the apparatuses and methods disclosed herein address this problem by providing more effective means for restoring macrobenthics during stream remediation.

Similar problems persist in restoration projects in saltwater waterways. In the process of restoring oyster reefs, biologist have been restoring oyster reefs by dumping large amounts of oyster shells or limestone rock on the bottom so that oysters can establish on areas that remain above the estuary substrate. Such efforts have limited success in some projects, however, due to the material sinking into the substrate. To combat this problem, biologist have resorted to displacing the weight of the bags of shells or rock by placing wooden structure beneath the bags. The most common materials use are wooden pallets and nylon bags to hold the shells or rock. Such materials are bulky, however, are not fully biodegradable, and may contain contaminants that negatively impact the environment. Embodiments of the apparatuses and methods disclosed herein provide a more natural approach to oyster reef restoration uses biodegradable materials and is free of the typical toxic chemicals commonly used in processing lumber material.

SUMMARY

Disclosed herein are embodiments of an apparatus for promoting macrobenthic growth in a waterway. The embodiments disclosed include a biodegradable net bag adapted to receive a biomass suitable for promoting macrobenthic (including without limitation oyster growth) growth in a waterway, and a biodegradable panel insert adapted to support the biomass. By filling the net bag with biomass, and deploying the net bag in a waterway, macrobenthic growth is promoted. Alternative embodiments disclosed herein further include an anchoring capability suitable to secure the net bag while it is deployed.

Also disclosed herein are embodiments of a method of promoting macrobenthic growth in a waterway. The embodiments disclosed include the steps of providing a biodegradable net bag open at one end and adapted to receive a biomass suitable for promoting macrobenthic growth, inserting a suitable biomass into the net bag, and deploying the net bag in a healthy waterway. After macrobenthic growth has occurred, the net bag is transported to a waterway undergoing remediation and re-deployed. In this manner, macrobenthic growth is further promoted in the waterway undergoing remediation.

BRIEF DESCRIPTION OF THE DRAWINGS

Other features in the invention disclosed herein will become apparent from the attached drawings, which illustrate certain preferred embodiments of certain apparatuses and the steps of certain methods, wherein:

FIG. 5 is an exploded, perspective view of an alternate embodiment of an apparatus according to the disclosure herein that is suitable for use in oyster bed remediation projects in estuaries with soft bottoms;

FIG. 6 is a side sectional view of the embodiment illustrated in FIG. 5 with optional anchors included.

DETAILED DESCRIPTION

Figure 1:
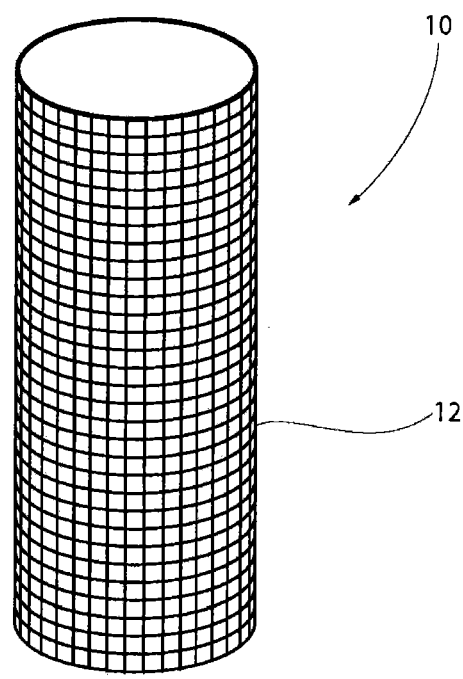
FIG. 1 is a perspective view of a biodegradable net bag suitable for use with embodiments of apparatuses according to the present invention, prior to closure of at least one end and filling with a suitable biomass.

While the following describes preferred embodiments of apparatuses and methods according to the present invention, it is understood that this description is to be considered only as illustrative of the principles of the invention(s) described herein and is not to be limitative thereof. Numerous other variations, all within the scope of the claims, will readily occur to those of ordinary skill in the art.

As used herein, the term "adapted" means sized, shaped, configured, dimensioned, oriented and arranged as appropriate, and the term "macrobenthic organism" means an organism living on or in the bottom of bodies of water that is large enough to be seen by the naked eye. Macrobenthic organisms include plants and animals. When referring to oyster bed remediation projects, "macrobenthic organisms" include, but are not limited to, oysters.

As used herein, the term "biomass" means material that promotes macrobenthic growth in a given waterway. Because of the diversity of waterways and the ecosystems they support, suitable biomass can vary greatly from one remediation project to the next. In freshwater stream applications, for example, suitable biomass typically includes, but is not limited to, mixtures comprising leaves, sticks or other plant materials, optionally combined with cotton seed cake, leaf cake, fish meal cake, or other nutritional material such as fish food, dog food, etc. (either mixed in or alone). In oyster bed remediation, suitable biomass typically includes oyster shell clusters, other shell material, and limestone rock. Because the apparatuses and methods disclosed herein are not intended to be limited to a specific waterway type, it will be understood that the term "biomass" as used in this disclosure is intended to be used in a broad sense to indicate any material suitable for supporting macrobenthic growth in a given waterway, and is not intended to be limited to the specific examples of biomass described.

As used herein, the term "anchor" refers to any structure suitable for securing an apparatus according to the present invention within a waterway. Examples of anchors include, but are not limited to, (i) hooks, chocks, wedges, or the like attached to an apparatus by a line and held in place by a stable structure in a waterway such as a rock, (ii) spikes, posts, or rebar structures that pass through an apparatus (or a line operably attached to an apparatus) and driven into the bottom of a waterway, (iii) a structure similar to a marine anchor that is adapted to burrow into the bottom of a waterway and is operably attached to an apparatus, (iv) a large and/or heavy structure such as a large rock or other item of sufficient weight and size to resist forces generated by ordinary flows in a waterway and operably attached to an apparatus, (v) an apparatus designed to be buried in the bottom of the waterway and operably attached to an apparatus to be secured, and (vi) other types of anchors known and understood by those of ordinary skill in the art.

The definitions and meanings of other terms herein shall be apparent from the following description, the figures, and the context in which the terms are used.

Figure 2:
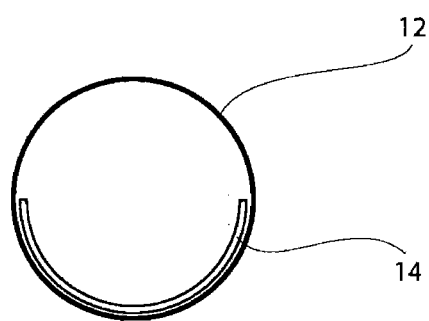
FIG. 2 is a side view of the embodiment illustrated in FIG. 1, showing the placement of a panel insert in the interior of the net bag.

FIG. 1 is an illustration of a preferred embodiment of a net bag 10 according to present invention, prior to the closing of at least one end. FIG. 2 illustrates an end view of the embodiment shown in FIG. 1. The illustrated net bag 10 is essentially a tubular bag having an open top end, formed from a rectangular sheet of biodegradable net material 12, with two parallel edges joined. Net bags 10 having diameters between four and forty-eight inches, and lengths between six and sixty inches are suitable for many remediation applications. The edges of rectangular panels of net material 12 may be joined by stitching or by any other means known to those of ordinary skill in the art. Embodiments of net bag 10 could also be formed, however, as pillow shapes (not illustrated) by joining multiple edges of separate panels of net material 12, or by taking a single panel of net material 12 and forming it into a pouch (not illustrated). Thus, while tubular embodiments of net bag 10 formed from a single panel of net material 12 have been found to be suitable for a variety of remediation projects, other embodiments of net bag 10 having different shapes and configurations may also be utilized.

As shown in FIG. 2, along one side of the interior of the net bag 12 is placed a preferably flexible biodegradable panel insert 14 adapted to support a biomass (24, as shown in FIG. 6) placed into net bag 12 prior to deployment in a waterway. Panel insert 14 may optionally be a solid mat of coir, wood by-product, coconut fiber fabric, jute matting, or any of a variety of other environmentally friendly, biodegradable materials known to those of skill in the art.

Figure 3:
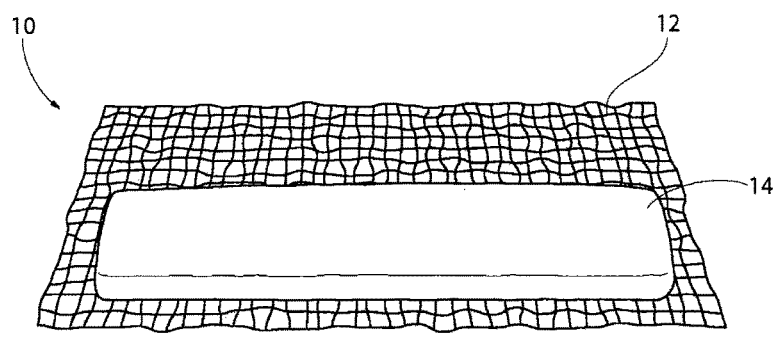
FIG. 3 is a perspective view of the embodiment illustrated in FIGS. 1 and 2, prior to being formed into a bag.

Referring to FIG. 3, panel insert 14 as illustrated covers approximately one half of the interior side of net bag 10. Larger or smaller panel inserts 14 could also be used, depending on the application, provided that a substantial portion of the interior of net bag 10 is covered such that panel insert 14 can support the necessary biomass (not illustrated). Panel insert 14 may also be a variety of thicknesses depending on the characteristics of the biomass to be supported (not illustrated) and bottom characteristics of the waterway in which net bag 10 is to be deployed. Thicknesses of between one-quarter of an inch and two inches have been found to be suitable for many applications, with a thickness of one-half inch being suitable for many stream remediation projects.

Prior to deployment, net bag 10 is filled with a biomass material (not illustrated) and the ends are closed (by stitching or any of a variety of other means known in the art). A variety of biomass materials may be used depending on the application and the nature of the macrobenthic organisms to be promoted. In freshwater stream applications, for example and without limitation, leaves and sticks may be used. An optional biomass matrix of cotton seed cake, leaf cake, fish meal cake, or other material such as: fish food, dog food, etc.

(either mixed in or alone) can be used as well to provide additional nutrients or attract other organisms deemed desirable in the remediation effort.

Figure 4:
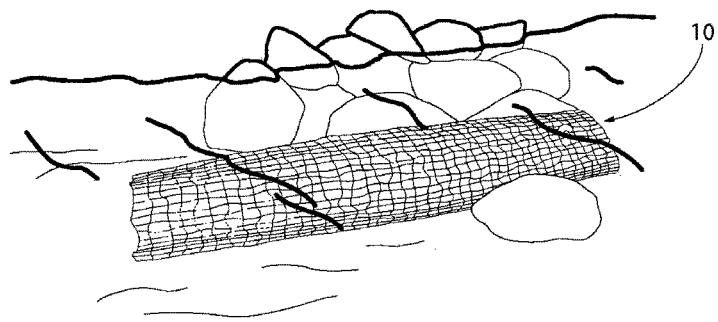
FIG. 4 is a perspective view of the embodiment illustrated in FIGS. 1 and 2, deployed in a stream.

FIG. 4 illustrates net bag 10 deployed in a shallow stream setting, after the biomass (not illustrated) has been inserted. As illustrated, net bag 10 is deployed in rocks suitable to retain it in the desired position. Optional anchors (not illustrated) adapted to attach to net bag 10 and to secure net bag 10 in a waterway may also be used. While a wide variety of anchors may be used (including without limitation hooks, chocks, wedges, rebar, spikes, etc.), one configuration that has been found to be convenient in stream remediation projects is to attach a hook (not illustrated) to a line (not illustrated) of biodegradable material tied to net bag 10, and then to wedge that hook (not illustrated) into the stream bottom or rocks in the stream. After deployment, desirable macrobenthic growth will occur on the biomass, which will in turn promote further macrobenthic growth in the waterway.

For remediation projects in waterways having soft silt or mud bottoms (such as those encountered in oyster reef remediation projects for example), additional steps may be desirable to help support net bag 10 above the bottom of the waterway. FIGS. 5 and 6 illustrate embodiments of apparatuses according to the present invention suitable for use in such environments. As illustrated, net bag 10 in this embodiment is adapted to receive oyster shell clusters or rocks to which oysters may attach. Net bag 10 rests on optional bottom fabric layer 25, which may be formed from the same materials described above in connection with panel insert 14. Depending on the characteristics of the bottom, attaching net bag 10 to optional bottom fabric layer 25 (by stitching, using anchor spikes as described below, or other means known in the art) may be sufficient to prevent net bag 10 from sinking too far into the bottom.

Where additional support is needed, frame 26 (which may be a simple wood frame formed of untreated wood) may be used underneath optional bottom fabric layer 25. Untreated wood is preferred because it is biodegradable and lacks chemicals that might be harmful to the environment to be remediated. In particularly soft bottoms, second bottom layer of fabric 28 (which may also be formed from the same materials as has been described above in connection with panel insert 14) may be used to provide additional resistance to sinking. While a variety of thicknesses may be used, thicknesses of between one-quarter of an inch and two inches for bottom layer of fabric 25 and second bottom layer of fabric 28 are suitable for many remediation projects.

In tidal areas where tidal flow may move net bags 10 including biomass 24, anchors may be used. As shown in FIG. 6, optional anchors 30 are spikes that pass through net bag 10, panel insert 14, bottom layer of fabric 25, frame 26, and second bottom layer of fabric 28 and into the waterway bottom (not illustrated). In such embodiments, optional anchors 30 secure the apparatus together (thereby eliminating the need to operably attach net bag 10, panel insert 14, bottom layer of fabric 25, frame 26, and second bottom layer of fabric 28 to one another). It should also be noted, however, that in particularly calm waterways, neither attachment nor anchoring may be necessary. It should still further be noted that while optional anchors 30 in the form of spikes may be used, many other types of anchor known in the art may also be used depending on the characteristics of the waterway and goals of the remediation project.

Figure 7:
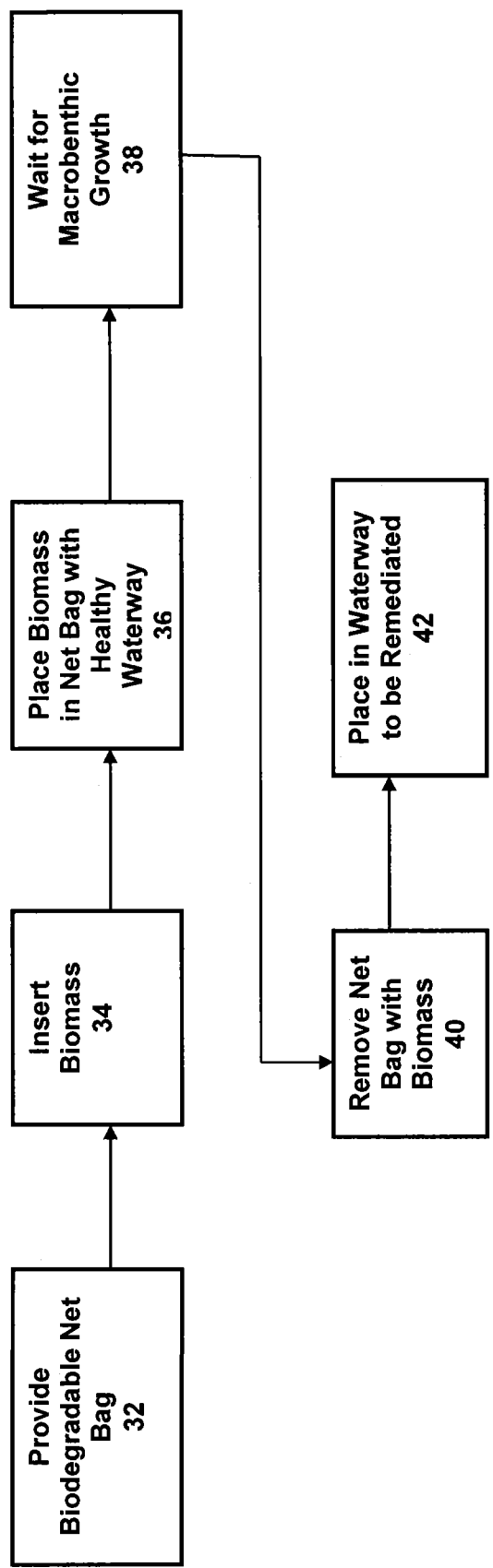
FIG. 7 is a schematic view of a method of promoting macrobenthic growth in a first waterway by using embodiments of apparatuses disclosed herein to collect and transport macrobenthic organisms from a second, healthy waterway.

As is shown in FIG. 7, methods of promoting macrobenthic growth in a waterway are possible using the apparatuses herein disclosed. In step 32, a biodegradable net bag (such as net bag 10 previously described) is provided, and an appropriate biomass is inserted in step 34. In step 36, the biomass and net bag are inserted into healthy waterway. In step 38, time is given for macrobenthic growth on the biomass to develop. In step 40, the net bag with biomass (and its attendant macrobenthic organisms) are removed and transported to a second waterway, which is in need of remediation. In step 42, the net bag with biomass is placed in the second waterway and anchored, as necessary. The seeding of macrobenthic organisms from the first healthy waterway into the second waterway promotes further development of macrobenthic organisms in the second waterway, thereby accelerating the remediation process. Over time, the materials used will biodegrade, leaving the second waterway to develop in a natural state.

As has been discussed above, net bag 10 may be used alone, or may be supported by a combination of bottom layer of fabric 25, frame 26, and second bottom layer of fabric 28 (all as shown in FIG. 6) as convenient depending on the needs of the remediation project. For example, and without limitation, in saltwater remediation projects, oyster growth may be promoted with an embodiment, of the method previously described by using oyster shell clusters (not illustrated) or rocks suitable for oyster attachment (not illustrated) as the biomass and supporting net bag 10 as shown in FIG. 6. In such applications, net bag 10 may be left in the first waterway to develop oyster growth in that location. Alternatively, oyster growth may be started in a first waterway, and then moved to a second waterway as described above and shown in FIG. 7.

It will thus be understood that the present invention provides an apparatus for cultivating and relocating leaf pack material and associated macrobenthic growth in riverbed(s) (or streambed, or any other underwater, freshwater location).

As illustrated, net material 12 (shown in FIG. 3 for example) is a large net with holes passing there through to allow water flow and ingress and egress of aquatic organisms. Panel insert 14 (shown in FIG. 3) and optional lower fabric layer 25 and optional second lower fabric layer 28 may conveniently be more of a solid matt of material to provide support for the biomass. In certain embodiments, net material 12 is made of coir fabric, and panel insert 14 is made of solid coir liner. In other embodiments, panel insert 14 can be made of jute matting or other biodegradable material that meets the needed criteria. The biomass materials selected should promote macrobenthic growth and, as has been discussed, the materials used throughout the apparatus are all preferably biodegradable.

Where transport of net bag 10 is required, the operator lifting net bag 10 out of a first waterway should ensure that the macrobenthic growth does not all exit through the holes in net material 12. Balancing the biomass in net bag 10 on top of panel insert 14 helps ensure the biomass does not simply slip through the holes in net material 12. The most advantageous time period for relocation will vary, but is typically the time period that most of the macrobenthic organisms would be in an egg or larvae stage and living in or attached to the substrate/micro-habitat. The exact time period would be determined during by a biologist familiar with macrobenthic organisms.

The advantages of the embodiments disclosed herein thus include providing: a simple way to recreate in-channel leaf pack and woody debris; a simple way to create a stable platform for macrobenthics to habitat; a simple system to grow, develop and transfer macrobenthics from a 'nesting' area to a restored/impaired stream channel or riverbed/ streambed; and the ability to transfer macrobenthic growth from a nursery stream or riverbed to a receiver/restored stream or riverbed will enhance the restoration in the receiver stream. A further advantage is providing a biodegradable platform to attract and grow oysters and promote oyster reef restoration.

It should further be understood that embodiments illustrated herein can also be linked together to form larger mats in streams or woody structures. Such stabilized reaches of woody debris can be used both in stabilization efforts in banks and slopes, and to promoter an increase in microhabitat for macrobenthics as well as smaller amphibians, fish and reptiles. The subsequent increase is the base of the food web then has subsequent beneficial effects on higher level organisms.

Similarly, in saltwater the described embodiments can be used to restore oyster reefs by stacking a single layer or multi-layer mattress(es) of solid fabric that can be supported by a wooden frame. The net bags can be filled with a proper substrate to attract oyster spat such as, but not limited to, oyster shells and/or limestone rock. As designed, the mattress will displace weight and keep the current invention from sinking into the substrate. The size of the apparatus used for this application depends on the site specific needs of handling and to minimize shifting of stuffed material. The apparatuses can be linked to make a larger structure if project needs determine a larger size is required. In addition, lower fabric layer 25 or second lower fabric layer 28 (both illustrated in FIG. 6), could be adapted to be larger layers sufficient to support a plurality of net bags 10. As noted above, an anchoring system can also be utilized to anchor the current invention to the existing substrate.

Other variations and embodiments of the present invention will be apparent to those of ordinary skill in the art in light of this specification, all of which are within the scope of the present invention as claimed. Nothing in the foregoing description is intended to imply that the present invention is limited to any preferred embodiment described herein.

What is claimed is:

1. An apparatus for promoting macrobenthic growth in a waterway comprising:
   (a) a biodegradable net bag, wherein said net bag is filled with biomass;
   (b) a biodegradable panel insert covering a portion of the interior of said net bag; wherein the biomass is supported by said panel insert;
   (c) a first fabric layer, wherein the net bag rests on the first fabric layer;
   (d) a frame formed of untreated wood with a second fabric layer on the bottom of said frame, wherein the first fabric layer and net bag rest on the top of the frame; and
   (e) anchors that pass through the net bag, the panel insert, the first fabric layer, the frame, and the second fabric layer.

2. The apparatus of claim 1 wherein the anchors are spikes.

3. The apparatus of claim 1 wherein the first and second fabric layers have a thickness of between 0.25 inches and 2 inches.

4. The apparatus of claim 1 wherein the biomass comprises oyster shell clusters.

5. The apparatus of claim 1 wherein the biomass comprises rocks.

* * * * *